G. H. TREADGOLD.
PNEUMATIC WHEEL.
APPLICATION FILED OCT. 20, 1911.
1,038,687.
Patented Sept. 17, 1912.
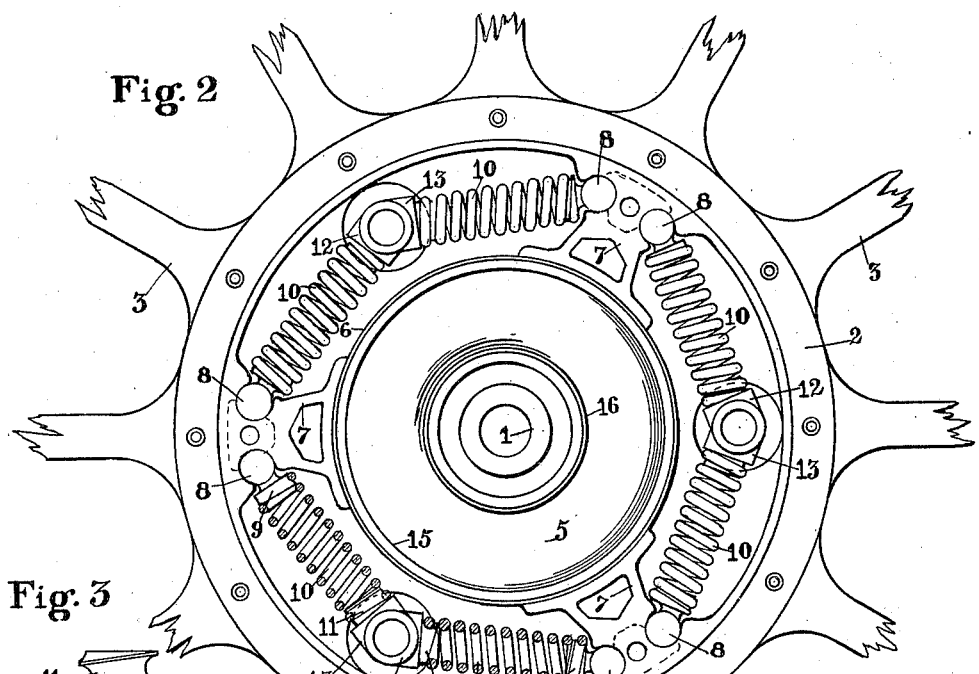
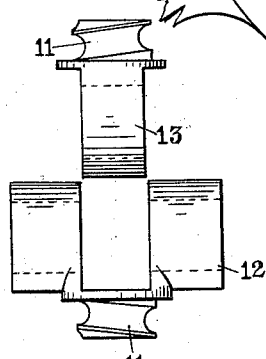
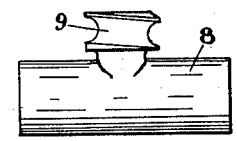
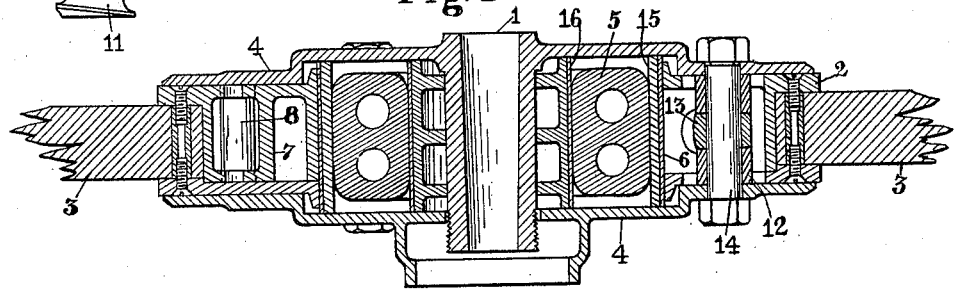
Witnesses
A. M. Shannon.
G. E. McGrann
Inventor
GEORGE H. TREADGOLD
By
Attorneys
COLUMBIA PLANOGRAPH CO., WASHINGTON, D. C.

UNITED STATES PATENT OFFICE.

GEORGE H. TREADGOLD, OF PORT HURON, MICHIGAN.

PNEUMATIC WHEEL.

1,038,687.  Specification of Letters Patent.  Patented Sept. 17, 1912.

Application filed October 20, 1911. Serial No. 655,679.

*To all whom it may concern:*

Be it known that I, GEORGE H. TREADGOLD, a citizen of the United States of America, residing at Port Huron, in the county of St. Clair and State of Michigan, have invented certain new and useful Improvements in Pneumatic Wheels, of which the following is a specification, reference being had therein to the accompanying drawings.

This invention relates to pneumatic wheels and more particularly to an arrangement thereof whereby the torque of the driving strain is conveyed from one member to another without affecting the pneumatic chamber.

The invention consists in the matters hereinafter set forth and more particularly pointed out in the appended claims.

In the drawings, Figure 1 is a view in transverse section of a wheel that embodies features of the invention; Fig. 2 is a view of the central portion of the wheel with a side retaining plate or collar removed; Fig. 3 is a view in detail of a spring keeper hinge; Fig. 4 is a view in detail of a spring knuckle.

In general terms, the wheel consists of an inner main hub 1 that is loosely encircled by a floating hub 2 from which spokes 3 radiate in the usual manner, sidewise displacements of the parts being prevented by collars 4 on the main hub which act as side thrust bearings. An annular pneumatic chamber 5 of suitable material is interposed between the hubs and holds them normally centered. A metallic sleeve 6 encircles the pneumatic chamber 5 and is centered in the hub 2 by bridges 7 extending radially inward. Preferably, these bridges are formed integrally with the hub and have frictional engagement with the sleeve 6. The bridges are preferably three in number and they are each provided with cylindrical sockets on opposite faces in which spring knuckles 8 are movably secured between the side collars of the main hub, one of the latter being removable. Each knuckle has a lug 9 screw-threaded or otherwise adapted to engage and hold a spiral spring 10 whose other end is likewise threaded on to a suitably arranged arm 11 extending from one of the members 12 or 13 of a spring keeper hinge which are pivoted on a stud 14 secured between the collars 4 of the main hub. When the removable collar of the main hub is taken off both the knuckles and hinge members may be slipped out together with the interposed springs.

If preferred and as herein indicated the sleeve 6 may have a liner 15 that closely encircles the pneumatic tube 5 and an inner bushing 16 may likewise be provided so that the pneumatic tube may be readily slipped in and out for repairs or inflation. The metallic lining of the pneumatic chamber does not impair its resiliency and prevents abrasion of the rubber against the oscillating faces of the hub.

As the springs are disposed symmetrically the studs 14 are centered normally by the springs between the bridges 7. Any oscillation of the wheel under load is overcome by the annular pneumatic tube or chamber while any rotation of one hub on the other is yieldingly met and overcome by the springs which, when forced to their limit, become rigid struts that positively arrest intermovement of the hubs. The pivotal connections between the springs and the hubs prevent any transverse deflection and shearing strain on the springs.

Obviously, changes in the details of construction may be made without departing from the spirit of the invention and I do not care to limit myself to any particular form or arrangement of parts.

What I claim as my invention is:—

1. In a wheel, a main hub having side collars one of which is detachable, an annular pneumatic chamber on the hub between the collars, a sleeve concentric on the chamber, a floating hub between the collars centered on the sleeve by inwardly projecting bridges, a spring keeper hinge pivoted to the collars between each pair of bridges, a spring knuckle removably journaled in each bridge adjacent a hinge, and compression springs each secured at one end to a knuckle and at the other end to a hinge member, the knuckles and hinges with connecting springs being bodily removable from the hubs when the collar is detached.

2. In a wheel, a main hub, side collars thereon one of which is detachable, an inner metallic bushing rotatable on the hub between the collars, an annular pneumatic chamber on the bushing and an outer metal liner on the chamber, a sleeve rotatable on the liner, a floating hub between the collars, inwardly extending bridges on the floating hub centering it on the sleeve, a spring keeper hinge between each pair of bridges removably pivoted to the collars, a spring knuckle removably journaled on each bridge adjacent a hinge and a spring in compression between each hinge member and adjacent knuckle.

In testimony whereof I affix my signature in presence of two witnesses.

GEORGE H. TREADGOLD.

Witnesses:
M. L. DE BATS,
MARCUS YOUNG.

Copies of this patent may be obtained for five cents each, by addressing the "Commissioner of Patents, Washington, D. C."